Jan. 9, 1945.   T. E. MURRAY   2,366,978
WELDING
Filed July 17, 1941
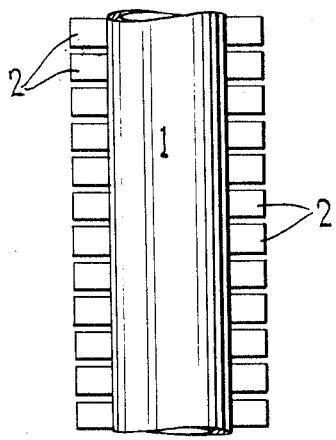
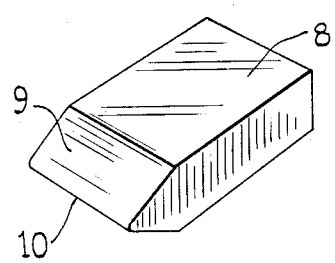
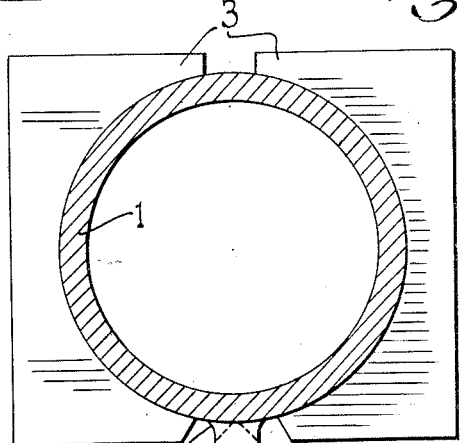
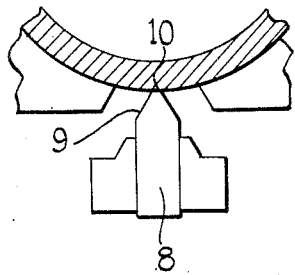
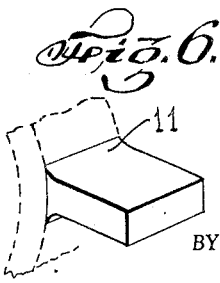
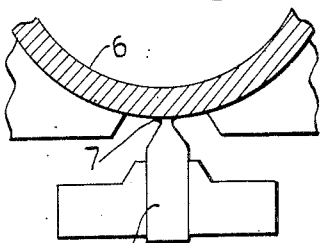
INVENTOR.
Thomas E. Murray
George T. Gill
ATTORNEY Patented Jan. 9, 1945

2,366,978

UNITED STATES PATENT OFFICE 2,366,978

WELDING

Thomas E. Murray, Brooklyn, N. Y.

Application July 17, 1941, Serial No. 402,748

1 Claim. (Cl. 219—10)

The invention herein disclosed relates to welding and more particularly to that kind of welding in which the pieces to be welded are brought to welding temperature by the passage of a heavy electric current therethrough and the weld effected by pressure exerted on the pieces.

One such welding process, for example, is commonly known as electric resistance welding. In this process, the pieces to be joined are pressed together under heavy pressure and a very heavy current is caused to pass between the pieces where the union is to be effected. The pieces are thus heated to welding temperature and become softened and somewhat plastic to the extent that the metal flows or upsets at the pressure under which the welding is carried out. Normally, in butt welding the ends or edges of two pieces of metal in this manner, the ends are forced into each other and metal is extruded at the joint. When the end of one piece is to be butt welded to the surface of another, it is desirable to provide a narrow edge of contact, preferably a line contact, in the beginning of the welding operation which restricts the path for the electric current and increases the resistance. This facilitates the welding operation.

Under the pressures used in electric resistance welding, in many cases, a sharp edge on a piece to be butt welded is difficult to maintain as the metal flattens out when it is brought against the surface of the other piece under welding pressure and preparatory to welding. Thus, the advantages that flow from a line or very narrow contact are not obtainable.

The invention herein disclosed is directed to a method in which the desired contact may be obtained and maintained until the pieces are heated and to minimizing the lateral extrusion or mushrooming of the end of a piece of metal that is so welded to another piece. In accordance with the invention, the end of a piece of metal to be butt welded to another piece is given a preliminary hardening. Preferably, the end of the piece is work-hardened as by swedging which effects a compression and work hardening of the metal at the location at which contact is to be made with the other piece. The hardening of the metal thus effected provides a definite welding advantage and minimizes the lateral spread or mushrooming of the metal.

The method of this invention may be applied, for example, in welding radial fins to curved surfaces such as the heat radiating fins applied to heat conducting tubes. This application of the invention which constitutes but one specific embodiment thereof is illustrated in the accompanying drawing in which:

Fig. 1 is a side elevation of one end of a heat conducting tube having radial heat radiating fins thereon;

Fig. 2 is an isometric view of a fin prior to being welded to the tube;

Fig. 3 is a cross-section of a tube and fin diagrammatically illustrating the welding operation;

Fig. 4 illustrates the effect on a piece to be welded when the method of this invention is not used;

Fig. 5 illustrates a like piece treated as herein described; and

Fig. 6 is an isometric view illustrating separately the shape of one of the fins when welded to the tube.

The unit illustrated in Fig. 1 of the drawing is a heat conducting tube 1 of the kind that is used in certain steam boilers wherein the tube constitutes a water tube through which heat from the furnace is transferred to the water within the tube. For the purpose of increasing the heating surface of the tube radial fins 2 are provided at diametrically opposite points. These fins are arranged in edge to edge relation and extend along the tube. A preferred method of applying the fins to the tube is by resistance butt welding, in which the fin is pressed against the tube while the tube and fin are heated to welding temperature by the passage of an electric current.

As shown diagrammatically in Fig. 3, the tube 1 is clamped between a pair of electrodes 3 and a fin 2 is clamped between electrodes 4. The electrodes are connected in circuit, with the electrodes 3 constituting the positive and the electrodes 4 the negative. In the welding operation the fin 4 is brought into contact with the tube under heavy pressure. A very heavy current is then caused to flow between the fin 2 and the tube 1 and these, adjacent their contacting surfaces, are quickly heated to welding temperature.

There is a definite welding advantage if a line contact or nearly a line contact can be maintained between the fin and the tube at the start of the welding operation as an extremely high current density is thus attained at the contact between the pieces. However, the pressures at which the pieces are brought together preparatory to the welding operation are such that the edge of the fin flattens, while cold, as illustrated in Fig. 4. In this figure there is illustrated a fin 5 which initially had a beveled end portion with a line contact edge. When brought against the tube 6, under the heavy pressure and preparatory to welding, it flattens and mushrooms as at 7. Thus, there is a fairly large area in contact and the advantages of an extremely high current density of a line contact are not attained.

In Fig. 2, a fin 8 is illustrated that has been prepared in accordance with the method of this invention. This fin has a wedge-shaped end section 9 which tapers to an edge 10. The end of the fin, adjacent the edge 10 is work hardened as by swedging. The work hardening effected in this way renders the edge of the fin hard enough to resist cold flattening as the fin is brought against the tube under welding pressure, preparatory to welding. The result is, as illustrated in Fig. 5, that the edge 10 of the wedge-shaped end 9 of the fin 8 makes practically a line contact with the tube when brought against the tube under welding pressure.

With this arrangement, the wedge shaped end of the fin and the adjacent area of the tube are quickly brought to welding temperature. As the metal is compressed, as the weld is effected, it does not mushroom over the surface of the tube but fills out and forms fillets 11 merging the radial surface of the fin into the surface of the tube.

While, the method has been specifically described in connection with welding fins to tubes, it will be apparent that it is equally applicable to many different welding operations where it is desired to avoid a great spreading or mushrooming of the metal at the weld. It will also be obvious that various changes may be made by those skilled in the art in the details of the steps of the method described in detail above within the principle and scope of the invention as expressed in the appended claim.

I claim:

In the process of electric resistance welding the edge of one piece of metal to the surface of another which includes bringing the edge of the one piece into contact with the surface of the other, passing an electric current across the contact between the pieces to heat the pieces in the weld area to welding temperature and pressing the heated pieces together, the steps of forming a narrow contacting edge on the one piece and effecting a localized work hardening of the narrow contacting edge of the piece, the hardening being effected in the portion effecting contact and throughout the entire edge such as to render the edge hard enough to resist cold flattening when brought into contact under welding pressure.

THOMAS E. MURRAY.